United States Patent
Linne

(10) Patent No.: US 7,967,717 B2
(45) Date of Patent: Jun. 28, 2011

(54) DEVICE FOR THE VARIABLE DRIVING OF A HOLLOW SHAFT WITH AN INTERNAL SPINDLE

(75) Inventor: Stefan Linne, Wedemark (DE)

(73) Assignee: Continental Aktiengesellschaft, Hanover (DE)

( * ) Notice: Subject to any disclaimer, the term of this patent is extended or adjusted under 35 U.S.C. 154(b) by 5 days.

(21) Appl. No.: 12/478,910

(22) Filed: Jun. 5, 2009

(65) Prior Publication Data
US 2009/0239702 A1    Sep. 24, 2009

Related U.S. Application Data

(63) Continuation of application No. PCT/EP2007/061986, filed on Nov. 7, 2007.

(30) Foreign Application Priority Data

Dec. 23, 2006   (DE) .................... 10 2006 061 463

(51) Int. Cl.
   *F16H 37/06* (2006.01)
(52) U.S. Cl. .................................. 475/329; 475/5
(58) Field of Classification Search .......... 475/1, 5, 475/22, 23, 31, 73, 282, 329, 343
See application file for complete search history.

(56) References Cited

U.S. PATENT DOCUMENTS

| | | | |
|---|---|---|---|
| 3,409,490 A | 11/1968 | Pacciarini et al. | |
| 3,769,856 A | 11/1973 | Casey | |
| 4,774,855 A * | 10/1988 | Murrell et al. | 475/31 |
| 5,770,004 A | 6/1998 | Ogawa | |
| 6,318,210 B1 | 11/2001 | Kiyosawa | |
| 7,354,368 B2 * | 4/2008 | Pollman | 475/72 |

FOREIGN PATENT DOCUMENTS

| | | |
|---|---|---|
| DE | 1729765 A1 | 4/1972 |
| DE | 102005016803 A1 | 10/2006 |
| EP | 0744277 A2 | 11/1996 |
| EP | 0984201 A1 | 3/2000 |
| GB | 1421028 A | 1/1976 |
| JP | 6206135 A | 7/1994 |
| JP | 11165358 A * | 6/1999 |

OTHER PUBLICATIONS

International Search Report dated Feb. 18, 2008.

* cited by examiner

*Primary Examiner* — Justin Holmes
(74) *Attorney, Agent, or Firm* — Laurence A. Greenberg; Werner H. Stemer; Ralph E. Locher

(57) ABSTRACT

A device for the variable driving of a hollow shaft and an inner shaft or spindle that is supported on the latter and lies inside it, is particularly suited for moving component parts of a tire building machine, using driving devices. The hollow shaft is coupled to the inner shaft or spindle by way of a planetary gear mechanism or a harmonic-drive gear mechanism, which is respectively constructed as a differential-speed gear mechanism. The hollow shaft and the shaft or spindle are made to run synchronously by way of a single driving device.

12 Claims, 2 Drawing Sheets

DEVICE FOR THE VARIABLE DRIVING OF A HOLLOW SHAFT WITH AN INTERNAL SPINDLE

CROSS-REFERENCE TO RELATED APPLICATION

Figure 1:
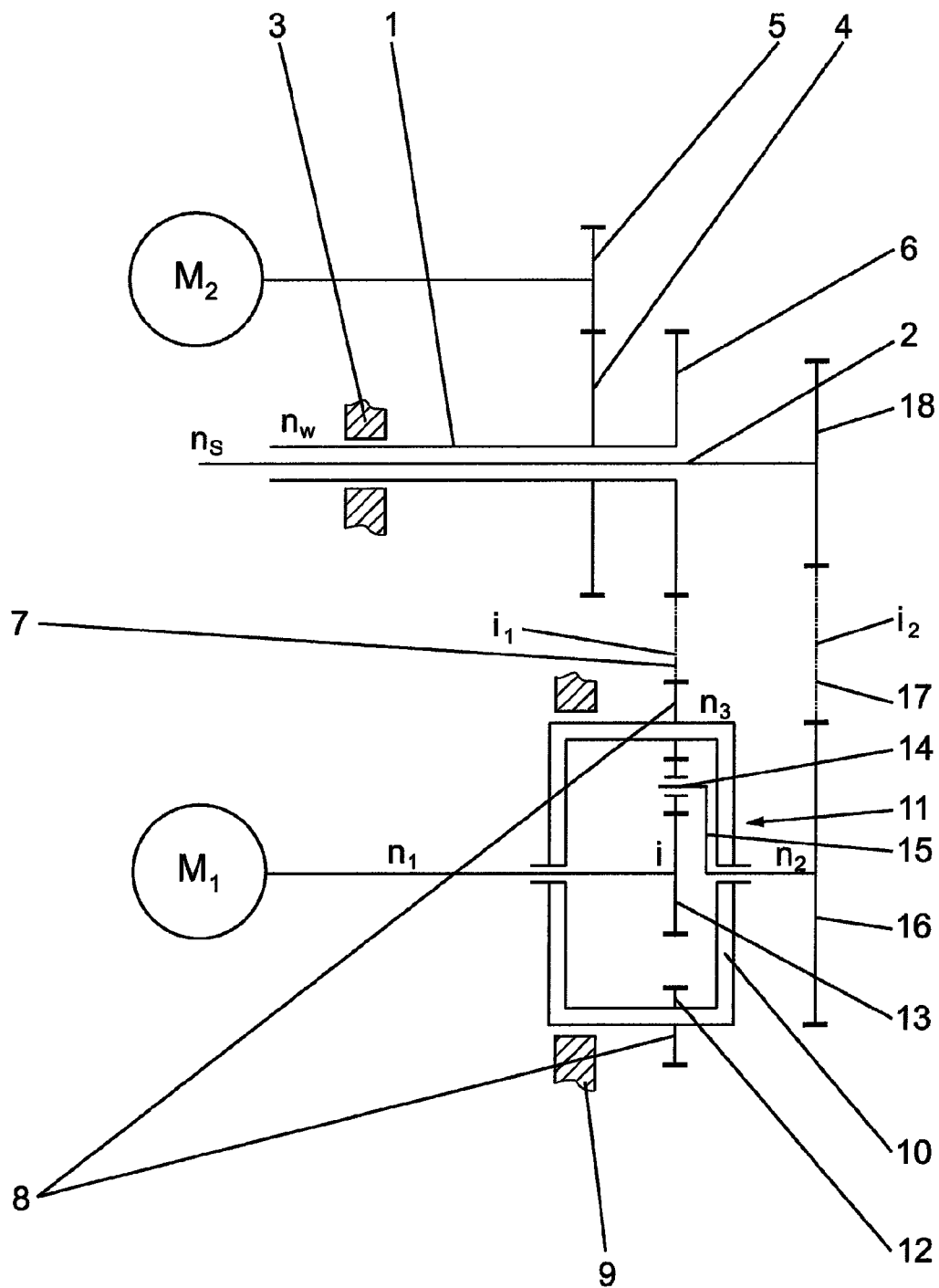

This is a continuation, under 35 U.S.C. §120, of copending international application No. PCT/EP2007/061986, filed Nov. 7, 2007, which designated the United States; this application also claims the priority, under 35 U.S.C. §119, of German patent application DE 10 2006 061 463.1, filed Dec. 23, 2006; the prior applications are herewith incorporated by reference in their entirety.

BACKGROUND OF THE INVENTION

Field of the Invention

The invention relates to a device for the variable driving of a hollow shaft and a shaft or spindle that is supported thereon and lies inside it, in particular for moving component parts of a tire building machine, by using drive devices.

In the case of machines for producing and for building pneumatic vehicle tires, it is customary to use a hollow shaft with an internal spindle supported thereon in order, for example, to be able to position cambering heads via a movement of the spindle, and in order to set the tire building machine into rotation via the hollow shaft, for example so as to roll up the belt package of a pneumatic vehicle tire. It must thereby also be ensured that the shaft can be operated without components being actuated by the spindle. Shaft and spindle must therefore also be capable of synchronous movement.

In the case of a prior art tire building machine, the shaft and the spindle are driven by one motor, or each by one motor, and can be mechanically coupled one on another during rotation of the shaft by way of a toothed coupling. However, it is thereby impossible to actuate the spindle and rotate the shaft simultaneously. In addition, only an incremental measurement system is available on two axes in the case of that prior art device. When changing between the operating modes of "rotating" and "spindling," it is necessary to save the positions of the axes in the controller and buffer them until the next switchover. Incorrect positions of the axes can occur as a consequence of errors. In the case of another mechanism, shaft and spindle are respectively driven by a dedicated motor. If the object is only to rotate the shaft, the two motors are operated synchronously. However, during this synchronous running it is scarcely possible to avoid the lag error, and thus also a mutual shifting of the shaft and spindle relative to one another. By way of example, this results in undesired displacement of the position of the cambering heads.

SUMMARY OF THE INVENTION

It is accordingly an object of the invention to provide a device for variably driving a hollow shaft with an inner spindle which overcomes the above-mentioned disadvantages of the heretofore-known devices and methods of this general type and which enables exact synchronous running, but also separate actuation of the hollow shaft and the shaft/spindle.

With the foregoing and other objects in view there is provided, in accordance with the invention, a variable drive apparatus, comprising:

a hollow shaft;
an inner shaft or spindle supported on said hollow shaft and lying inside said hollow shaft;
a drive gear constructed as a differential speed gear selected from the group consisting of a planetary gear and a harmonic drive gear, said drive gear coupling said hollow shaft to said inner shaft or spindle; and
a drive device connected to said drive gear;
wherein said drive gear is coupled between said hollow shaft and said inner shaft or spindle for synchronously driving said hollow shaft and said inner shaft or spindle with only said drive device.

The hollow shaft and the inner shaft or spindly are particularly suited for driving moving component parts of a tire building machine.

In other words, the objects of the invention are achieved by virtue of the fact that the hollow shaft is coupled to the inner shaft or spindle via a planetary gear or a harmonic drive gear that is respectively constructed as differential speed gear, such that synchronous running of hollow shaft and shaft or spindle is performed via a single drive device.

The coupling of the hollow shaft to the shaft or spindle via a planetary gear or a harmonic drive gear enables a single drive device to be used for synchronous running of the hollow shaft and shaft or spindle, it being possible to set the hollow shaft and shaft or spindle rotating at an exactly corresponding speed through the design of the speed transformations provided.

In accordance with a preferred embodiment of the invention, the drive device for synchronous running is that drive device which drives the hollow shaft, in particular via an appropriate speed transformation. The second drive device provided in the case of an inventive device acts on the sun wheel of the planetary gear. These measures permit the speed ratios to be selected and the number of the gear components required for the speed transformation, such as toothed wheels and toothed belts, to be kept low, and reliable and long-lasting functioning of the device to be ensured.

A design that is very favorable with regard to the speed transformation of the device results when the drive device that drives the hollow shaft also acts on the planet pinion carrier and drives the latter.

In a preferred design of the gear arrangement belonging to the inventive device, it is provided that, for synchronous running of hollow shaft and shaft or spindle in conjunction with a fixed sun wheel of the planetary gear, the rotary movement of the hollow shaft is transmitted via the hollow wheel to the planet pinion carrier and from the latter to the shaft or spindle, this being done with appropriate speed transformation. In the case of this embodiment, it is provided for a rotary movement of the shaft or spindle in conjunction with a fixed hollow shaft and fixed hollow wheel of the planetary gear that the sun wheel is driven such that the rotary movement thereof is transmitted via the planet pinion carrier to the shaft or spindle.

The number of the gear components provided is particularly low in the case of a design in which, for synchronous running of hollow shaft and shaft or spindle in conjunction with a fixed sun wheel of the planetary gear, a rotary movement of the driven planet pinion carrier is transmitted via the hollow wheel and the housing of the planetary gear to the shaft or spindle, this being done with appropriate speed transformation. In the case of this design variant, it is provided for a rotary movement of the shaft or spindle in conjunction with a fixed hollow shaft and fixed planet pinion carrier of the planetary gear to drive the sun wheel whose rotary movement is transmitted via the planet pinion to the hollow wheel and the housing of the planetary gear and via these parts to the shaft or spindle.

Motors are particularly suitable as drive devices. It is also possible, however, to provide a pneumatic rotary cylinder as a drive device for the sun wheel of the planetary gear. This drive device is particularly suitable for the case when only small rotary angles are required for the shaft or spindle.

Other features which are considered as characteristic for the invention are set forth in the appended claims.

Although the invention is illustrated and described herein as embodied in a device for the variable driving of a hollow shaft with an internal spindle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE SEVERAL VIEWS OF THE DRAWING

Figure 2:
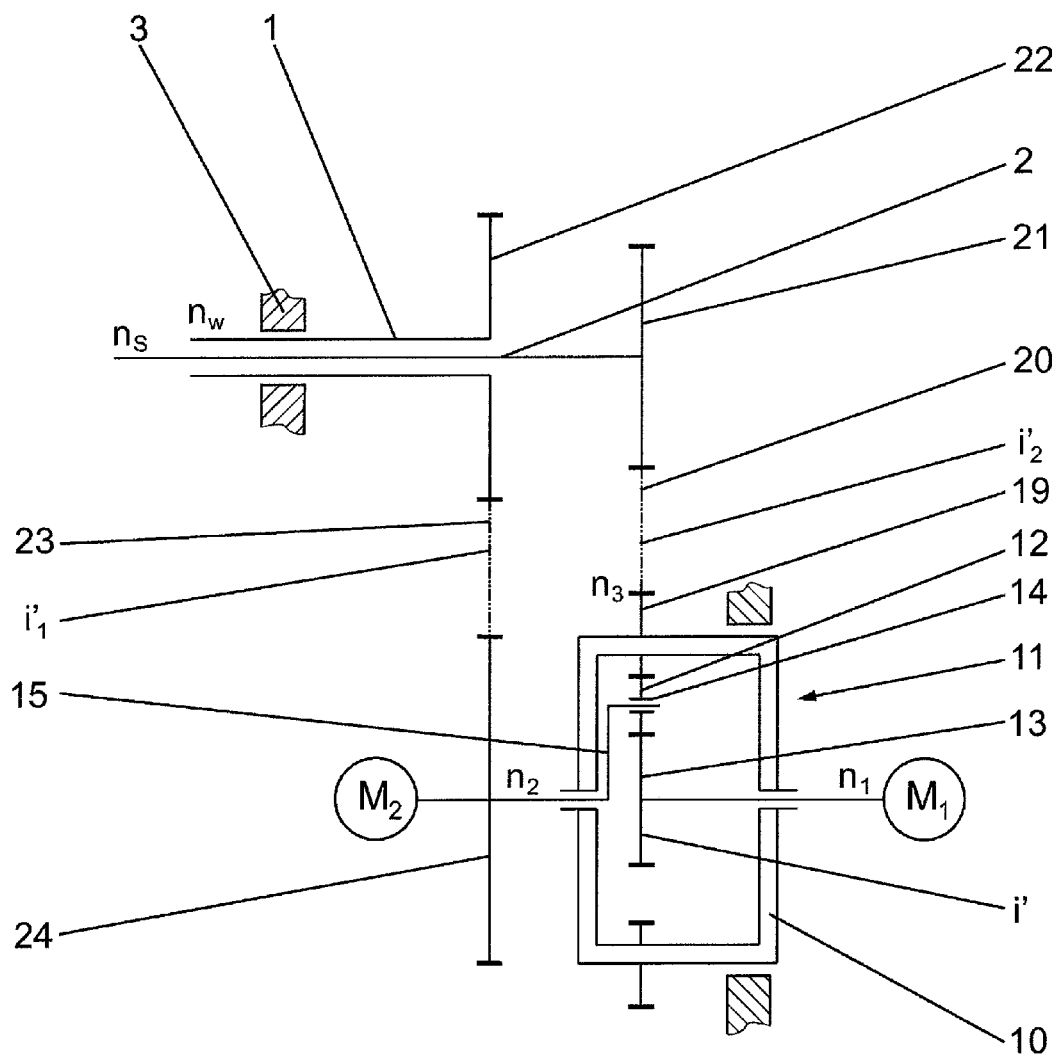

FIG. 1 is a schematic illustration of an exemplary embodiment of the device according to the invention; and FIG. 2 is a schematic illustration of an alternative embodiment.

DETAILED DESCRIPTION OF THE INVENTION

The inventive device permits, in a particularly reliable and expedient way, a synchronous drive of a hollow shaft and an inner shaft or spindle located therein and supported on the hollow shaft. A preferred use of the device is therefore in the case of tire building machines, the hollow shaft sets the tire building machine in rotation, for example, in order to roll up the belt package of a pneumatic vehicle tire, for example, and the spindle shifting cambering heads, for example, in an axial direction compared with one another in a known way.

Referring now to the figures of the drawing in detail and first, particularly, to FIG. 1 thereof, the apparatus according to the invention includes a hollow shaft 1, an inner shaft or internal spindle 2, and a bearing 3 for the hollow shaft 1. The spindle 2, which may also be referred to as an inner shaft, is supported on the hollow shaft 1 in a way not shown such that during a rotary movement of the shaft 1 the spindle 2 is simultaneously set rotating. A toothed wheel 4 is permanently connected to the shaft 1. The toothed wheel 4 engages with a further toothed wheel 5 that can be set rotating by a motor $M_2$. A further toothed wheel 6, permanently connected to the shaft 1, is coupled via a toothed belt 7 to a toothed wheel 8 that is seated on a housing 10 of a planetary gear 11 and is permanently connected thereto. 9 denotes the bearing for the housing 10 of the planetary gear 11. A hollow wheel 12 that rolls on the inside of the housing 10 and is permanently connected thereto engages with at least one planet pinion 14 that is arranged on a planet pinion carrier 15 that is guided to the outside from the housing 10, in a fashion aligned with the axis of the planetary gear 11, and carries a toothed wheel 16 here. The toothed wheel 16 is coupled via a toothed belt 17 to a toothed wheel 18 that is permanently connected to the spindle 2.

The sun wheel 13 of the planetary gear 11 can be driven by means of a motor $M_1$ located outside the planetary gear 11 and engages in the planet pinion 14.

There are a multiplicity of possible ways of operating the device, in particular by means of a separate or a common operation of the motors $M_1$ and $M_2$. Three important operating modes are explained in more detail below by way of example. Since the spindle 2 located in the hollow shaft 1 is supported against the hollow shaft 1, one important operating mode is that in the case of which the hollow shaft 1 and the spindle 2 are set rotating synchronously in order, for example, to set a tire building drum rotating via the hollow shaft 1, the invention being, however, for the spindle 2 not to change its position relative to the hollow shaft 1, for example in order to maintain the position of cambering heads. The motor $M_2$ is taken into operation for this operating mode and sets the shaft 1 rotating at the speed of $n_w$ via the toothed wheels 4 and 5. The toothed wheel 6 connected to the shaft 1 transmits the rotary movement of the shaft 1 via the toothed belt 7 to the toothed wheel 9, and thus to the housing 10, which is set rotating at a speed $n_3$. The hollow wheel 12 permanently connected to the housing 10 sets rotating the planet pinion 14, which is engaged with it and in this case revolves relative to the fixed sun wheel 13 along the hollow wheel 12 and between the hollow wheel 12 and the sun wheel 13. The planet pinion carrier 15 is thereby set rotating and its crank part, which is aligned with the axis of the sun wheel 13, sets rotating at a speed $n_2$ the toothed wheel 16 that transmits the rotary movement via the toothed belt 17 to the toothed wheel 18, which is permanently connected to the spindle 2 and sets the latter rotating at the speed $n_s$.

The following relationship holds for the planetary gear 11:

$$n_1 - i \times n_2 - (1-i) \times n_3 = 0 \tag{1}$$

where
  i is the speed transformation of the planetary gear 11,
  $i_1$ is the speed transformation of the shaft 1 in relation to the housing 10 of the planetary gear 11,
  $i_2$ is the speed transformation of the spindle 2 in relation to the planet pinion carrier 15 of the planetary gear 11

The speed $n_1$ of the sun wheel 13 of the planetary gear 11 is zero during stoppage of the motor $M_1$ when only the motor $M_2$ is being operated, and it holds that:

$$\frac{i-1}{i} = \frac{n_2}{n_3} \text{ and } i_1 = \frac{n_3}{n_w} \text{ and } i_2 = \frac{n_2}{n_s} \text{ and } 1 = \frac{n_w}{n_s} \tag{2}$$

The following relationship holds for the speed transformations $i_1$, $i_2$ between the shaft 1 and the spindle 2, on the one hand, and the planetary gear 11, on the other hand:

$$i_1 = i_2 \times \frac{i-1}{i} \tag{3}$$

From the transformations, the following transmission ratio results for the motor $M_1$ to the spindle 2:

$$i_{ges} = i \times i_2 \frac{n_1}{n_s} \tag{4}$$

For the above-mentioned case in which the shaft 1 and the spindle 2 are to be set rotating synchronously with a sole operation of the motor $M_2$, the speed $n_w$ of the shaft is equal to the speed $n_s$ of the spindle 2. The speed ratios of the participating toothed wheels and toothed belts are adapted correspondingly to one another.

In the case of a further possible operating mode, only the spindle 2 is set rotating in relation to the hollow shaft 1. In this case, the motor $M_1$ operates the sun wheel 13 of the planetary gear 11, and the hollow wheel 12 is the fixed component part of the planetary gear 11. The planet pinion 14, which engages both with the sun wheel 13 and with the hollow wheel 12, runs between sun wheel 13 and hollow wheel 12, and thereby sets the crank-like planet pinion carrier 15 rotating at the speed of $n_2$. The planet pinion carrier 15 operates the toothed wheel 16 that sets rotating via the toothed belt 14 the toothed wheel 18 that rotates the spindle 2. Also possible is a common operation of the motors $M_1$ and $M_2$ in order to set the shaft 1 rotating non-synchronously in relation to the internal spindle 2. Depending on the direction of rotation of the servomotors $M_1$ and $M_2$, there are a multiplicity of possible operating modes of the gear arrangement, in particular through selection of the speed $n_w$ of the shaft 1, and the speed $n_1$ of the sun wheel 13, the speed $n_2$ of the planet carrier 15, and the speed $n_s$ of the spindle 2.

In the schematic, shown in FIG. 2, of a further embodiment, once again 1 denotes the hollow shaft, 2 the internal spindle that is supported on the hollow shaft 1 in a way not shown, and 3 the bearing for the hollow shaft 1. Permanently connected to the shaft 1 is a toothed wheel 22 that is coupled via a toothed belt 23 to a further toothed wheel 24 that can be set rotating by a motor $M_2$. The motor $M_2$ simultaneously drives the planet pinion carrier 15 of the planetary gear 11, which is also present in the case of this embodiment. The planet pinion carrier 15 sets moving at least the one planet pinion 14 between the hollow wheel 12, which is permanently connected to the housing 10 of the planetary gear 11, and the sun wheel 13. With the interposition of a toothed belt 20, a toothed wheel 19 arranged on the outside of the housing is connected to a toothed wheel 21 that is permanently connected to the spindle 2. The second motor, the motor $M_1$, is provided for the purpose of driving the sun wheel 13 of the planetary gear 11. $n_w$ denotes the speed of the hollow shaft 1, $n_s$ the speed of the spindle 2, $n_1$ the speed of the sun wheel 13 of the planetary gear 11, $n_2$ the speed of the planet pinion carrier 15 of the planetary gear 11, and $n_3$ the speed of the housing 10 of the planetary gear 11.

In the case of this design variant, as well, there are a multiplicity of possible ways of operating the device by separate or common operation of the motors $M_1$ and $M_2$. Only the sole operation of the motor $M_2$ and the sole operation of the motor $M_1$ are briefly described below in this case. Given an appropriate setting of the speed ratios of the participating toothed wheels and toothed belts, the sole operation of the motor $M_2$ effects a synchronous movement of the hollow shaft 1 and the spindle 2 with corresponding speeds and $n_w$ and $n_s$. Via the toothed wheel 24, the toothed belt 23 and the toothed wheel 22, the motor $M_2$ sets the hollow shaft 1 rotating at the speed $n_w$. Given a fixed sun wheel 13, the motor $M_1$ is not operating and the motor $M_2$ sets the planet pinion carrier 15 and thus the planet pinion 14, moving simultaneously at the speed $n_2$. The toothed wheel 19 is thereby set rotating via the housing 10, this rotary movement being transmitted via the toothed belt 20 to the toothed wheel 21, and from there to the spindle 2.

If the aim is only for the spindle 2 to be set rotating relative to the hollow shaft 1, when the motor $M_2$ is stationary the motor $M_1$, which drives the sun wheel 13 of the planetary gear 11, is taken into operation, the planet pinion carrier 15 now being the fixed component part of the planetary gear 11. The sun wheel 13 sets rotating the planet pinion 14 that transmits its movement to the hollow wheel 12 and thus to the housing 10 and the toothed wheel 19. Via the toothed belt 20, the toothed wheel 19 is coupled to the toothed wheel 21 that sets the spindle 2 rotating. The following relationship holds for the planetary gear 11.

$$n_1 - i' \times n_2 - (1-i) \times n_3 = 0 \tag{5}$$

where
$i'$ is the speed transformation of the planetary gear 11,
$i_1'$ is the speed transformation of the shaft 1 in relation to the planet pinion carrier 15 of the planetary gear 11,
$i_2'$ is the speed transformation of the spindle 2 in relation to the housing 10 of the planetary gear 11.

In order for the shaft 1 and the spindle 2 not to move relative to one another during the stoppage of the motor $M_1$, $n_1$ is equal to zero, and the following holds true:

$$\frac{i'-1}{i'} = \frac{n_2}{n_3} \text{ and } i_1' = \frac{n_3}{n_w} \text{ and } i_2' = \frac{n_2}{n_s} \text{ and } 1 = \frac{n_w}{n_s} \tag{6}$$

The following (7) holds true for the speed transformations $i_1'$, $i_2'$ between the shaft 1 and the spindle 2, on the one hand, and the planetary gear 11, on the other hand:

$$i_2' = \frac{i_1'}{x} \frac{i'-1}{i'} \tag{7}$$

A number of further possible operating modes are also feasible in the case of this design variant, depending on direction of rotation of the motors $M_1$ and $M_2$, and dependent on the choice of speeds.

Only small angles of rotation of the spindle 2, for example an angle of 30° to 45°, are required for specific applications. For the case in which there is no need to prompt complete revolutions of the spindle 2, the motor $M_1$ can also be replaced by a pneumatic rotary cylinder.

If large speed ratios are required, the planetary gear shown can be replaced by a so-called harmonic drive gear.

There are a number of further advantageous applications of the inventive device in the case of tire building machines. These include, for example, carrying out the collapse of a so-called tilting drum on the first stage of tire building machines. In the case of a tilting drum, a switchover is made between the winding diameter and the diameter for removal of the carcass. This is performed by rotating an inner and an outer shaft, it being possible to drive the shafts in accordance with the invention. A further possible application exists in the case of adjusting diameters on building drums of tire building machines. In this case, it is possible to apply to the inner shaft a spindle that is supported on the outer shaft, such that it is possible to adjust the outer diameter of a segmented drum via a cone or lever, which is arranged around the outer shaft, in order to be able to fabricate tires of different sizes. In the case of tire building machines, the width of building drums can be adjusted by applying to the inner shaft a spindle that is supported on the outer shaft.

The invention claimed is:
1. A variable drive apparatus, comprising:
a hollow shaft;
an inner shaft or spindle lying inside said hollow shaft, and supported on said hollow shaft freely rotatable relative to said hollow shaft in complete revolutions;

a drive gear constructed as a differential speed gear selected from the group consisting of a planetary gear and a harmonic drive gear; and a first drive device connected to said drive gear and a second drive device connected to said drive gear;

wherein said drive gear is connected between said hollow shaft and said inner shaft or spindle for selective operation in three operating modes, including:

a first operating mode in which said drive gear is coupled between said first drive device, said hollow shaft, and said inner shaft or spindle for synchronously driving said hollow shaft and said inner shaft or spindle with only said first drive device;

a second operating mode in which said inner shaft or spindle is freely rotated independently of said hollow shaft with only said second drive device and while said first drive device and said hollow shaft are stationary; and a third operating mode in which said hollow shaft and said inner shaft or spindle are non-synchronously driven by said first drive device and said second drive device, respectively.

2. The device according to claim 1, wherein said shafts are configured to drive moving component parts of a tire building machine.

3. The device according to claim 1, wherein said drive device is connected for driving said hollow shaft.

4. The device according to claim 1, wherein said drive gear is a planetary gear with a planet pinion carrier and said drive device is connected to also drive said planet pinion carrier.

5. The device according to claim 1, wherein said drive gear is a planetary gear with a sun wheel, and which further comprises a second drive device for driving said sun wheel of said planetary gear.

6. The device according to claim 1, wherein said drive gear is a planetary gear with a sun wheel, a hollow wheel, and a planet pinion carrier, and wherein, for synchronously driving said hollow shaft and said inner shaft or spindle, a rotation of said hollow shaft is transmitted via said hollow wheel to said planet pinion carrier, and from said planet pinion carrier to said inner shaft or spindle, with a corresponding speed transformation.

7. The device according to claim 1, wherein said drive gear is a planetary gear with a sun wheel, a planet pinion carrier, and a hollow wheel, and wherein, with said hollow shaft and said hollow wheel being stationary, said inner shaft or spindle is rotated by driving said sun wheel and transmitting a rotation thereof to said inner shaft or spindle via said planet pinion carrier.

8. The device according to claim 1, wherein said drive gear is a planetary gear with a sun wheel, a hollow wheel, a planet pinion carrier, and a housing, and wherein, for synchronously driving said hollow shaft and said inner shaft or spindle in conjunction with a stationary sun wheel of said planetary gear, a rotary movement of the driven planet carrier is transmitted via said hollow wheel and said housing of said planetary gear to said inner shaft or spindle, with a corresponding speed transformation.

9. The device according to claim 1, wherein said drive gear is a planetary gear with a sun wheel, a hollow wheel, a planet pinion carrier a planet pinion connected to said planet pinion carrier, and a housing, and wherein, with said hollow shaft and said planet pinion carrier of said planetary gear held stationary, said inner shaft or spindle is rotated by driving said sun wheel and transmitting a rotary movement thereof via said planet pinion to said hollow wheel and said housing of said planetary gear, and to thereby transmit the rotary movement to said inner shaft or spindle.

10. The device according to claim 1, wherein said drive device is a motor.

11. The device according to claim 5, wherein said drive device and said second drive device are motors.

12. The device according to claim 1, wherein said drive gear is a planetary gear with a sun wheel, and said drive device for driving said sun wheel is a pneumatic rotary cylinder.

* * * * *